June 1, 1965 A. CHIAPUZIO, JR., ETAL 3,187,303

DIGITAL PEAK READER

Filed March 30, 1960 2 Sheets-Sheet 1

INVENTORS
ANTON CHIAPUZIO, JR.
HOWARD A. TOPP, JR.

BY

Allan Rothenberg

ATTORNEY

June 1, 1965 A. CHIAPUZIO, JR., ETAL 3,187,303

DIGITAL PEAK READER

Filed March 30, 1960 2 Sheets-Sheet 2

INVENTOR.
ANTON CHIAPUZIO JR.
HOWARD A. TOPP JR.
BY
Allan Rothenberg
ATTORNEY

United States Patent Office 3,187,303

Patented June 1, 1965

3,187,303
DIGITAL PEAK READER

Anton Chiapuzio, Jr., Downey, and Howard A. Topp, Jr., Fullerton, Calif., assignors to North American Aviation, Inc.

Filed Mar. 30, 1960, Ser. No. 18,631
2 Claims. (Cl. 340—146.2)

This invention relates to peak reading apparatus, and particularly concerns apparatus for determining the maximum or minimum value of a varying quantity.

In different types of testing apparatus, and in automatic checkout equipment in particular, it is often necessary to employ apparatus for determining the peak (maximum and/or minimum) value of the various characteristics or outputs of the tested system during a selected test period. Since, in many systems, information is handled in digital form, it is desirable to provide peak reading apparatus which is able to directly accept digital information.

Accordingly, it is an object of this invention to provide a digital peak reading apparatus requiring solely a digital input.

In carrying out the principles of this invention in accordance with a preferred embodiment thereof, there is provided a register for storing, in digital form, the peak value of an input signal and a comparator responsive to both the input signal and the signal stored in the register for providing a register read-in signal when a specified one of the two comparator inputs is greater than the other. The register read-in signal is utilized to enable the storage in the register of the actual or instantaneous value of an input. Thus, for maximum peak reading, for example, whenever the input signal is greater than the signal stored in the register, read-in to the register is enabled and the instantaneous value of the input signal replaces the previously obtained peak value signal which has been stored in the register.

It is to be understood, of course, that the invention is capable of use with analog information simply by interposing a conventional analog-to-digital converter between the analog information whose peak is to be read and the digital input to the described peak reader.

On object of this invention is to provide a digital indication of the peak value, whether maximum or minimum peak, of a varying signal.

A further object of the invention is the provision of a completely digital peak reader.

Figure 1:
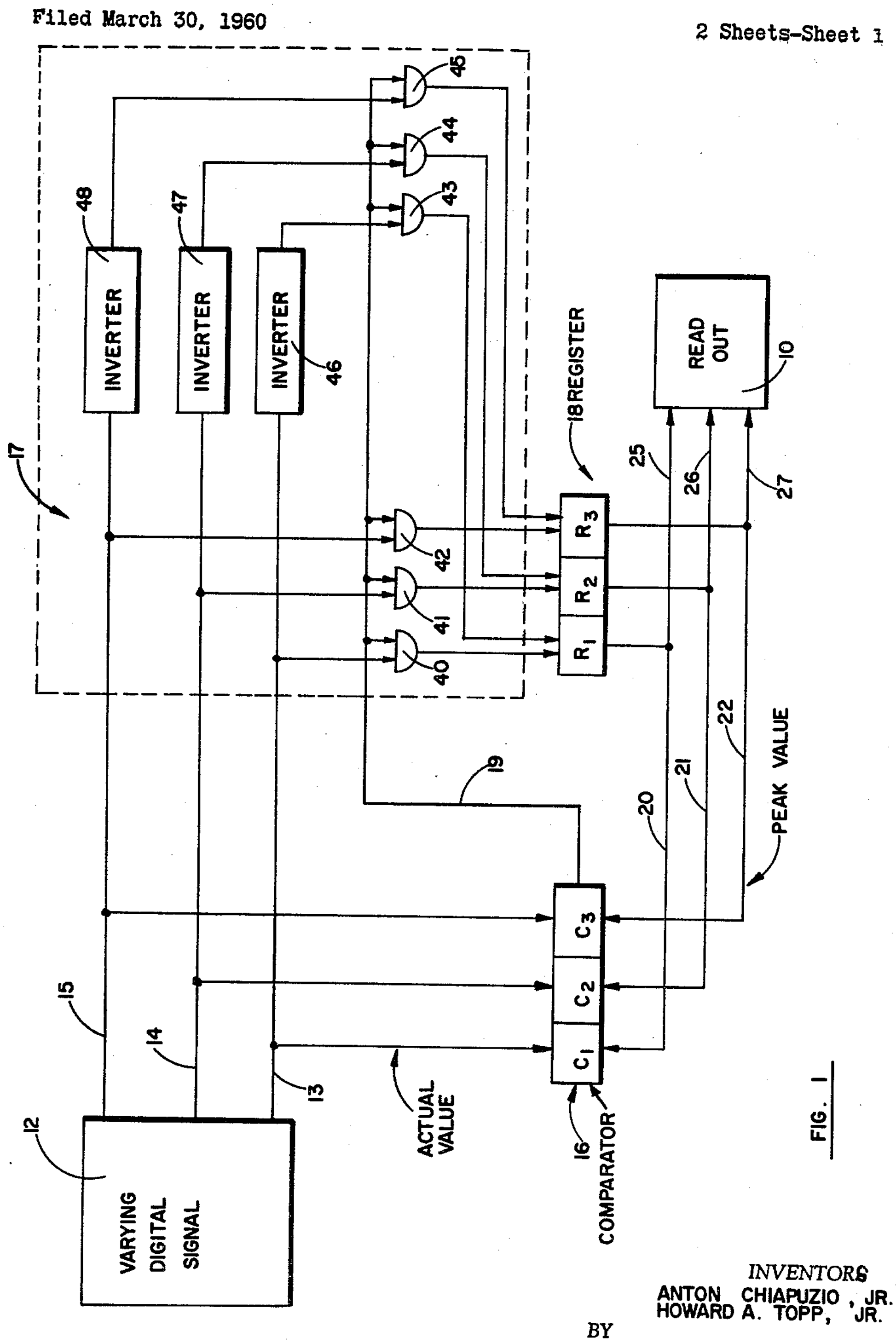
Figure 2:
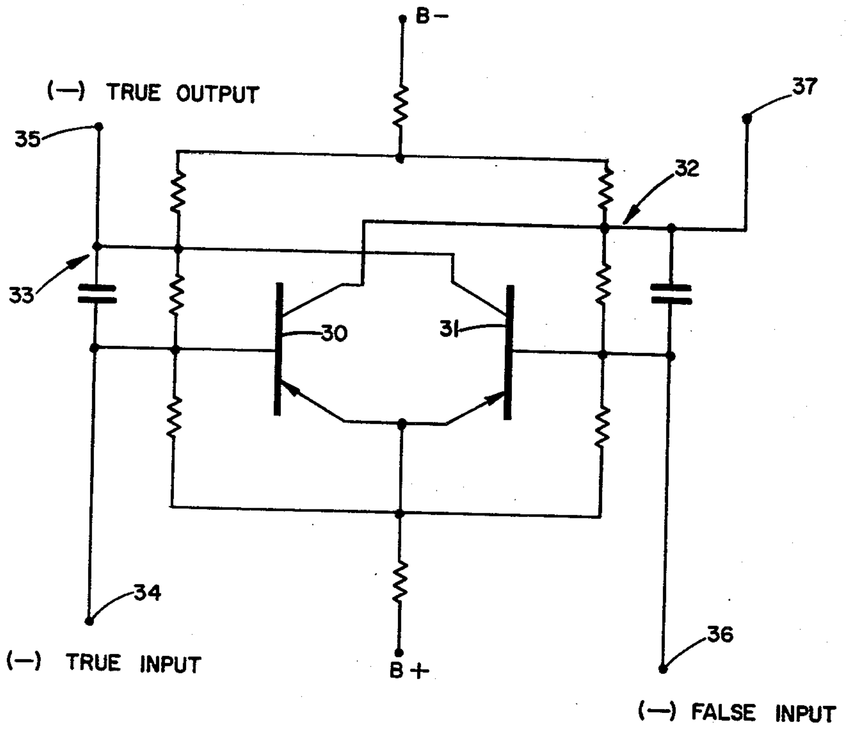

These and other objects of the invention will become apparent from the following description taken in connection with the accompanying drawings in which:

FIG. 1 is a block diagram of a digital peak reader constructed in accordance with the principles of this invention;

And FIG. 2 illustrates the circuitry of an exemplary register stage.

As illustrated in FIG. 1, an apparatus is provided for affording an indication in a readout device 10 of the peak value of a varying digital signal which is presented from an input apparatus indicated at 12. The system operates in parallel binary code, that is, each digit of a number to be handled is represented by a binary 1 or binary 0 in the form of a relatively negative or relatively positive voltage and at least one lead is provided for each digit to be handled. Thus, in the three bit code illustrated in the apparatus of FIG. 1, the varying digital input signal has the three bits thereof provided on leads 13, 14, and 15 respectively numbered in order from lowest to highest significance.

The varying digital signal on input leads 13, 14, and 15 is fed directly as one input (herein termed the actual value input) to a three-stage comparator 16 and is also fed via read-in logic or gates indicated within the dotted box 17 to a three-stage storage register 18. The several comparator stages are designated as $C_1$, $C_2$ and $C_3$, while the several register stages are designated as $R_1$, $R_2$ and $R_3$ in order from lowest to highest significance. The number of stages of register and comprator is exemplary only, depending only on the number of orders of the input signals. The read-in logic 17 comprises a gating arrangement under control of an output appearing on lead 19 from the comparator 16. The number stored in the several register stages is fed via leads 20, 21, and 22 as the second input to the comparator 16. Initially, the register will store the actual value of the input signal which appears on leads 13, 14, and 15. The input signal is at all times fed directly to the comparator 16 where it is compared with the signal stored in the register. When any subsequent actual value of the input signal is greater than the signal previously stored in the register, the comparator provides an output which enables the read-in logic whereby the number previously stored in the register is replaced by the actual value which the comparator has now determined to be greater than the previously stored number. If the actual value is less than the peak value stored in the register, the comparator provides no output whereby the read-in logic 17 is inoperative. Thus, the register retains the peak value stored therein. This peak value is fed at all times to a conventional readout device 10 via leads 25, 26, and 27 to provide a digital indication of the peak value as desired.

As illustrated in FIG. 2, each stage of the exemplary register 18 comprises a conventional flip-flop or bi-stable multivibrator. This flip-flop includes a pair of transistors 30 and 31, each having its collector coupled to the base of the other by means of conventional parallel resistance-capacitance networks 32, 33. A negative (binary 1) signal fed to a "true" input terminal 34, causes transistor 30 to conduct, raising tthe potential of its collector. Increase in the collector potential of the transistor 30 effects cutoff of transistor 31 whereby the collector of the latter goes negative. Thus, a negative signal at input terminal 34 provides a negative output signal at output terminal 35 which is connected to the collector of transistor 31. Similarly, a negative signal at the "false" input terminal 36 provides a negative signal at the second output terminal 37 which is connected to the collector of the transistor 30 and also provides a positive signal at output terminal 35.

Comparator 16 is of a conventional and well-known construction and may be of the type specifically described in the U.S. Patent No. 2,885,665, to G. D. Smoliar for "Binary Relative Magnitude Comparator." Other comparators capable of use in the described system are disclosed in an application of Martin Rubin for "Binary Digital Comparator," Serial No. 776,803, filed November 28, 1958, and in an application Serial No. 761,107 of Howard A. Topp, Jr., et al., for "Automatic Functional Test Equipment," filed September 15, 1958. These comparators compare two digital inputs thereto, comparing corresponding orders simultaneously and provide at an output thereof, such as indicated at output lead 19 of FIG. 1 a negative or true signal, for example if, and only if, one input thereof is greater than the second input thereof.

As illustrated in FIG. 1, the true value of each digit on input lines 13, 14 and 15 may be represented by a relatively negative signal. Corresponding true values of the stored signals in register 18 are also represented by relatively negative signals derived from register storage output terminals corresponding to that indicated at 35 in FIG. 2. Where the inverse of the true signal (a relatively positive signal) is required, these may be provided by suitable inverters in the form of conventional amplifiers having an odd number of stages or may be conveniently derived from the second output terminal of the register stage corresponding to that indicated at 37 in FIG. 2.

The input signals from the source of varying information 12 are fed to the read-in logic which basically comprises a number of true "and" gates 40, 41 and 42, and a number of false "and" gates 43, 44 and 45. The input signal is fed as one input to false "and" gates 43, 44 and 45 via inverters 46, 47 and 48, respectively. A second input to each of the "and" gates of the read-in logic is derived from the comparator output on lead 19.

Initially, each resistor stage reads zero whereby any non-zero value of the input signal will cause a negative signal to appear at comparator output on lead 19. Those of input leads 13, 14, and 15 which are true are relatively negative whereby a certain combination of "and" gates 40, 41 and 42 is enabled as determined by the combination of negative signals on leads 13, 14 and 15. "And" gates 40, 41 and 42 are conventional circuits which provide a negative signal at the output thereof in response to simultaneous occurrence of negative signals at both inputs. These "and" gates have their outputs connected to the true input terminal indicated at 34 in FIG. 2 of the corresponding register stages. Thus, a selected combination of register stages is set into the true condition and the value of the input signal which exists at the time of the comparator output is stored in the register as the peak value. For a false or binary zero condition on any of input leads 13, 14 and 15, there is a relatively positive signal appearing on the lead which is fed through a corresponding one of inverters 46, 47 and 48 to provide a relatively negative signal as one of the inputs to the corresponding one of the false "and" gates 43, 44 and 45. These "and" gates are also enabled by the occurrence of a negative signal on comparator output lead 19 and have the outputs thereof connected to the corresponding false terminals of the register stages such as that indicated at 36 in FIG. 2. Thus, a false signal on one of input leads 13, 14 and 15 will set a corresponding register input stage to zero or false condition.

It will be readily appreciated that the comparator output may be used to reset to zero all register stages and, with a suitable delay, to also enable one set of "and" gates 40, 41, 42. In such an arrangement, inverters 46, 47, 48 and the other set of gates 43, 44, 45 may be eliminated.

It will be seen that the register 18 stores the maximum value of the varying input signal. It remains unchanged when the input signal is less than the number stored in the register since, in such a situation, no output signal is provided from caparator 16. However, if at any time the input signal becomes greater than the peak value which has been stored in the register, the comparator indicates this condition by providing a negative signal on its output lead 19. This enables gates 40 through 45 and permits the actual value of the varying input signal to be read-in to the register, replacing the peak signal previously stored therein. Thus, the register at all times contains the maximum value of the input signal which is continuously available from the output device 10.

The connections from the register to the comparator and other output device are illustrated as both being taken from the true output terminals 35 of the register stages. It is apparent that the readout connections may also be derived from the false output terminals of the register stages.

The apparatus described above affords a peak reading of the maximum peak value of the input signal. It will be readily appreciated that the apparatus may be arranged to afford a peak reading of the minimum peak of the varying input signal simply by interchanging the comparator inputs. With such interchanged inputs, the negative enabling signal appearing on oput lead 19 of the comparator would occur solely when the peak value stored in the register is greater than the actual value of the varying input signal.

In the use of comparator such as that illustrated in the Smoliar patent, a pair of output terminals are provided. In this apparatus, one of the output terminals is negative if a first input is greater than the second input while the other of the output terminal is negative if the second input is greater than the first input. With such apparatus, interchange of comparator inputs is not required to read maximums or minimums. It is merely necessary to select the particular comparator output terminal which corresponds to the particular peak (that is, maximum or minimum) which is desired to be indicated.

With such a comparator as described in the patent to Smoliar, where a pair of comparator outputs respectively indicate a first input greater than the second and the second input greater than the first, simultaneous reading of both maximum and peak values may be simply provided by using but a single comparator with two registers each with its own read-in logic. One comparator output is utilized to control read-in logic to the maximum reading register while the other comparator output is utilized to control the read-in logic of the minimum reading register.

It will be readily appreciated that where the digital input signal is available from conventional counters embodying a number of bi-stable devices, each digit is available from the individual bi-stable stage in both true and false or relatively negative and positive voltages simultaneously. Thus, the inverters 46, 47 and 48 may be eliminated by connecting the corresponding inputs of the false "and" gates 43, 44 and 45 to the false output terminals of the several stages of the input device.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Extreme value reading apparatus comprising an input device providing first and second groups of digital signals, a register for storing said first group of digital signals representing a numerical value, said second group of digital signals representing the actual value of a signal of which the extreme value is to be read, gating means for passing said first group of digital signals to said register, a comparator having a first group of input terminals for receiving said first group of digital signals from said register and a second group of input terminals for receiving said second group of digital signals from said input device, said comparator producing an output signal when said second group of digital signals from said input device represent a value having a predetermined relation in magnitude to a value represented by said first group of digital signals stored in said register, and a gate controlling means connected from said comparator to said gating means for enabling said gating means to pass said second group of digital signals from said input device into said register in response to said comparator output signal.

2. Apparatus for reading the extreme value of a varying signal comprising a storage register for storing the extreme value of said varying signal in digital form, gating means for selectively passing the instantaneous value of said varying signal in digital form to said register for storage therein as an extreme value, comparison means responsive to the instantaneous value of said varying signal in digital form and to the extreme value stored in said register in digital form for determining whether or not to store said varying signal being compared, and said gating means being responsive to said comparision means to selectively pass said compared varying signal into said register.

References Cited by the Examiner

UNITED STATES PATENTS

| | | | |
|---|---|---|---|
| 2,798,216 | 7/57 | Goldberg | 340—347 |
| 2,815,500 | 12/57 | Hance | 340—149 |

| | | | |
|---|---|---|---|
| 2,865,567 | 12/58 | Boothe et al. | 340—172.5 |
| 2,949,228 | 8/60 | Bailey | 340—149 |

OTHER REFERENCES

Pages 1245–1249, 10/53—Proceedings, of IRE by Thomas, W. H.

MALCOLM A. MORRISON, *Primary Examiner.*

EVERETT R. REYNOLDS, IRVING L. SRAGOW, *Examiners.*